United States Patent
Charlier et al.

(10) Patent No.: US 6,749,911 B1
(45) Date of Patent: Jun. 15, 2004

(54) BLAXIALLY ORIENTED HOLLOW BODIES BASED ON RANDOM PROPYLENE TERPOLYMERS AND PROCESS FOR THE MANUFACTURE OF THESE HOLLOW BODIES

(75) Inventors: Jean Charlier, Ceroux-Mousty (BE); Emmanuel Delaite, Braine-Le-Comte (BE)

(73) Assignee: BP Belgium N.V., Berchem (BE)

( * ) Notice: Subject to any disclaimer, the term of this patent is extended or adjusted under 35 U.S.C. 154(b) by 0 days.

(21) Appl. No.: 09/345,743

(22) Filed: Jul. 1, 1999

(30) Foreign Application Priority Data

Jul. 10, 1998 (BE) ............................................. 09800526

(51) Int. Cl.⁷ ........................... B29C 55/26; C08F 8/50; C08F 10/02; C08F 10/06; C08F 10/08

(52) U.S. Cl. .................. 428/35.7; 428/36.9; 428/36.92; 264/532; 264/537; 264/331.17

(58) Field of Search ............................... 428/35.7, 35.2, 428/35.9, 36.4, 36.9, 36.92; 264/531, 532, 331.15, 331.17, 537, 900–909

(56) References Cited

U.S. PATENT DOCUMENTS

| 3,862,265 A | * | 1/1975 | Steinkamp et al. ..... 260/878 R |
| 4,470,796 A | * | 9/1984 | Stroup et al. ................ 425/526 |
| 4,663,219 A | * | 5/1987 | Janocha et al. .............. 428/213 |
| 5,436,041 A | * | 7/1995 | Murschall et al. .......... 428/34.2 |
| 5,691,043 A | * | 11/1997 | Keller et al. ................. 428/212 |
| 5,811,185 A | * | 9/1998 | Schreck et al. ............. 428/349 |
| 5,910,539 A | * | 6/1999 | Matsunaga et al. ........... 525/88 |

FOREIGN PATENT DOCUMENTS

| DE | 28 27 764 | 1/1980 |
| EP | 0 251 340 | 1/1988 |
| EP | 0 384 431 | 8/1990 |
| EP | 0 764 514 | 3/1997 |

* cited by examiner

*Primary Examiner*—Harold Pyon
*Assistant Examiner*—Sow-Fun Hon
(74) *Attorney, Agent, or Firm*—Norval B. Galloway

(57) ABSTRACT

The biaxially oriented hollow bodies are obtained by employing random propylene terpolymers which comprise ethylene (0.5 to 5% by weight) and 1-butene (2 to 12% by weight), which have a melting temperature of 120 to 150° C., which are degraded by a free radical generator and which have a degradation factor A of from 1.5 to 10, the said factor being represented by $MFI_g/MFI_i$, in which $MFI_g$ is the melt flow index of the degraded terpolymer (of between 3 and 30 g/10 min) and $MFI_i$ is the melt flow index of the initial terpolymer (of between 2 and 15 g/10 min). The process for the manufacture of the biaxially oriented hollow bodies is by injection stretch blowmoulding. The biaxially oriented hollow bodies are used for packaging.

19 Claims, No Drawings

BIAXIALLY ORIENTED HOLLOW BODIES BASED ON RANDOM PROPYLENE TERPOLYMERS AND PROCESS FOR THE MANUFACTURE OF THESE HOLLOW BODIES

This application claims priority from Belgium application No. 09800526, filed Jul. 10, 1998.

BACKGROUND OF THE INVENTION

The present invention relates to hollow bodies based on random propylene terpolymers. It relates more particularly to biaxially oriented hollow bodies possessing good optical and mechanical properties obtained from depolymerized random propylene terpolymers.

The present invention also relates to a process for the manufacture of these hollow bodies and more particularly the manufacture of biaxially oriented hollow bodies by injection stretch blow moulding of preforms, also known as parisons.

The ceaselessly growing demand for plastic hollow bodies of high quality possessing the transparency of glass has resulted in intensive research, especially in the polypropylene (PP) sector. However, the use of such a material leads to problems of control of manufacture. Manufacturers of equipment, such as Bekum and Nissei ASB, have developed devices which overcome the difficulties encountered with the machines constructed previously (problems of control of the manufacturing cycle) and which allow the production of biaxially oriented PP (BOPP) hollow bodies of high quality by an injection stretch blow moulding cycle. The PP resins used for this application are, on the one hand, homopolymers which are rigid but translucent and, on the other hand, random copolymers with ethylene which exhibit a wide range of melting temperatures and good optical properties but an inferior rigidity. There therefore still exists a market demand for hollow bodies based on polypropylene resins exhibiting an optimum compromise between the mechanical and optical properties and the processability.

Application DE-A-2,827,764 discloses a process for the preparation of a random propylene terpolymer, intended in particular for the manufacture of heat-sealable sheets, by copolymerization of propylene with ethylene and a higher 1-alkene and then degradation (depolymerization) of the polymer obtained by extrusion in the molten state in the absence of oxygen and of free radical generators.

U.S. Pat. No. 5,436,041 claims a printable transparent biaxially oriented multilayer sheet, both faces of which are sealable; the central layer is composed of a PP depolymerized by peroxides (preferred degradation factor: from 4 to 8) and one of the faces can be composed of a random $C_3$-$C_2$-$C_4$ terpolymer which can be depolymerized by peroxides (preferred degradation factor: from 6 to 10).

SUMMARY OF THE INVENTION

A random propylene terpolymer degraded (depolymerized) by free radical generators which is very particularly suitable for the production of transparent biaxially oriented hollow bodies has now been found.

To this end, the present invention relates to biaxially oriented hollow bodies obtained by employing a random propylene terpolymer which comprises from 83 to 97.5% by weight of monomer units derived from propylene, from 0.5 to 5% by weight of monomer units derived from ethylene and from 2 to 12% by weight of monomer units derived from 1-butene, which has a melting temperature of 120 to 150° C. (measured according to ASTM Standard D 3418) and which is degraded by a free radical generator, the degradation factor A being from 1.5 to 10 and the said factor A being defined as being the ratio $MFI_g/MFI_i$, in which $MFI_g$ is the melt flow index of the degraded terpolymer and is between 3 and 30 g/10 min and $MFI_i$ is the melt flow index of the initial terpolymer and is between 2 and 15 g/10 min.

The melt flow index (MFI) is measured at 230° C. under a load of 2.16 kg and is expressed in g/10 min (ASTM Standard D 1238).

DETAILED DESCRIPTION OF THE INVENTION

Random propylene terpolymers which are particularly well suited to the preparation of biaxially oriented hollow bodies made of degraded random propylene terpolymers comprise from 1.5 to 3% by weight of monomer units derived from ethylene and from 5 to 8% by weight of monomer units derived from 1-butene, the balance being composed of monomer units derived from propylene.

Furthermore, preference is given to the random terpolymers with an initial melt flow index $MFI_i$ ranging from 2.5 to 7 g/10 min and more particularly still from 4.5 to 5.5 g/10 min and with a melt flow index after degradation $MFI_g$ ranging from 5 to 20 g/10 min and more particularly still from 7 to 15 g/10 min. The degradation factor A does not generally exceed 5.

The random propylene terpolymers employed according to the present invention are degraded by melt blending with a free radical generator in an appropriate amount.

The free radical generator is generally chosen from organic peroxides, persulphates and diazo compounds (and their mixtures). Preference is given to organic peroxides. Mention may be made, as non-limiting examples of peroxides which can be employed, alone or as a mixture, of diaryl, alkyl aryl and dialkyl peroxides, such as dicumyl peroxide, t-butyl cumyl peroxide and 2,5-dimethyl-2,5-di(t-butylperoxy)hexane (DBPH), or of peresters, such as ethyl 3,3-bis(t-butylperoxy)butyrate and ethyl 3,3-bis(t-amylperoxy)butyrate. The peroxides which are the most suitable are those which decompose at the temperatures at which the melt blending is carried out. 2,5-Dimethyl-2,5-di (t-butylperoxy)hexane (DBPH) has given excellent results.

The amount of free radical generator employed to degrade (and therefore depolymerize) the random propylene terpolymers is generally at least equal to 0.05 g/kg of terpolymer and generally does not exceed 0.6 g/kg of random propylene terpolymer. Advantageously, the amount of free radical generator is equal to or greater than 0.1 g/kg and does not exceed 0.5 g/kg of random terpolymer.

The melt blending of the terpolymer and of the free radical generator is generally carried out under temperature and duration conditions such that they bring about the at least partial melting of the random propylene terpolymer. They are preferably such that there is complete melting of the terpolymer.

The blending is generally carried out at a temperature not exceeding 350° C.; this temperature generally does not exceed 300° C.; it preferably does not exceed 250° C. The minimum temperature at which the melt blending is carried out is generally greater than or equal to 100° C. and generally this temperature is greater than or equal to 130° C.; it is preferably greater than or equal to 140° C. Good results are obtained when this temperature is greater than or equal to 200° C. and does not exceed 240° C.

The duration of blending is chosen according to the nature of the free radical generator and the blending temperature. The optimum duration can advantageously be evaluated by preliminary tests.

The random propylene terpolymer can be blended with the free radical generator in any device known for this purpose. Thus, internal or external kneaders can be used. Internal kneaders are the most appropriate and, among them, non-continuous kneaders of Brabender type and continuous kneaders, such as extruders. Extruders are generally preferred.

In addition to the free radical generator, the random propylene terpolymers subjected to degradation can comprise other conventional additives, such as antioxidizing agents, antiacid agents, UV stabilizers, antistatic agents, colorants or fillers, in the usual amounts. They can also comprise nucleating agents, which improve the transparency and the surface gloss of the hollow bodies, as well as their rigidity. Mention may be made, as non-limiting examples of such nucleating agents, of sorbitol derivatives. Dibenzylidenesorbitol has given excellent results.

The random terpolymers according to the present invention can be employed alone or as a blend with other polymers, such as polyolefins and more particularly crystalline homo- or copolymers of propylene. The structures obtained can be mono- or multilayer. The hollow bodies obtained by employing the terpolymer alone give good results.

The random propylene terpolymers which can be used in implementing the present invention can be obtained by any known process for the copolymerization of propylene with ethylene and 1-butene, such as, for example, by a gas-phase process, and by means of any sufficiently active and productive known catalytic system of Ziegler-Natta type which makes it possible to polymerize propylene in a sufficiently stereospecific form and which can incorporate the required amounts of 1-butene and of ethylene in the polymer.

The preferred catalytic systems for preparing the terpolymers which can be used according to the invention comprise:

a catalytic solid comprising magnesium, titanium and chlorine as essential components, an organoaluminium compound, preferably a trialkylalurninium, very particularly triethylaluminium.

The catalytic solids which can be used to prepare the terpolymers are well known to a person skilled in the art. They generally comprise an electron-donating compound (internal electron-donor) chosen from mono- and diesters of aromatic carboxylic acids, preferably from dialkyl phthalates, very particularly diisobutyl phthalate.

The catalytic systems generally also comprise:

an electron-donating compound (external electron-donor) chosen from esters of aromatic carboxylic acids and alkoxysilanes of formula $R^1 Si(OR^2)_{4-n}$, in which $R^1$ represents a hydrocarbon-comprising group comprising from 1 to 12 carbon atoms, $R^2$ represents a hydrocarbon-comprising group comprising from 1 to 8 carbon atoms and n is 1, 2 or 3.

The esters of aromatic carboxylic acids preferably used as external electron-donor are alkyl and alkoxyalkyl benzoates, very particularly the ethyl p-ethoxy benzoate. Alkoxysilanes which are preferred as external electron-donor are alkylalkoxy- and cycloalkylalkoxysilanes, very particularly diisobutyl-dimethoxysilane, n-propyltrimethoxysilane, dicyclopentyldimethoxysilane and cyclohexylmethyl-dimethoxysilane.

The various constituents of the catalytic system are generally employed so that the atomic ratio of the aluminium of the organoaluminium compound to the titanium of the catalytic solid is from 3 to 300. In addition, the molar ratio of the aluminium of the organoaluminium compound to the electron-donating compound is generally from 0.5 to 60.

The other general conditions of the copolymerization are well known to a person skilled in the art. The temperature is generally from 20 to 150° C. The polymerization is generally carried out at a pressure greater than atmospheric pressure, preferably from 10 to $50 \times 10^5$ Pa.

The molecular weight distribution (MWD) of the degraded terpolymer is contracted. The degraded random terpolymers generally exhibit a molecular mass distribution such that Mw/Mn is between 3 and 8 and more particularly between 4 and 6.

The present invention also relates to a process for the manufacture of biaxially oriented hollow bodies made of random propylene terpolymers degraded by a free radical generator, such as are specifically described above.

To this end, the invention relates to a process for the manufacture of biaxially oriented hollow bodies by injection stretch blow moulding of a random propylene terpolymer which comprises from 83 to 97.5% by weight of monomer units derived from propylene, from 0.5 to 5% by weight of monomer units derived from ethylene and from 2 to 12% by weight of monomer units derived from 1-butene, which has a melting temperature of 120 to 150° C. and which is degraded by a free radical generator, the degradation factor A being from 1.5 to 10 and the said factor A being defined as being the ratio $MPI_g/MFI_i$, in which $MFI_g$ is the melt flow index of the degraded product and is between 3 and 30 g/10 min and $MFI_i$ is the melt flow index of the initial copolymer and is between 2 and 15 g/10 min.

The process for moulding biaxially oriented hollow bodies by injection stretch blow moulding, which is well known per se to a person skilled in the art, comprises in all cases a first stage during which a preform is injection moulded.

The hollow body is obtained by stretch blow moulding of this preform. The hollow body can be manufactured in a single stage (technique also known as "hot cycle") by linking the injection moulding of the preform, control of the temperature of the preform resulting from the injection at the temperature of orientation of the terpolymer, followed by the longitudinal stretching of the preform and by its blow moulding. The hollow body is preferably manufactured in two stages (technique also known as "cold cycle") comprising the injection moulding of a preform, which is allowed to cool, and the subsequent stretchblow moulding of the preform, which has been subjected beforehand to a thermal conditioning at the temperature of orientation of the terpolymer.

Whatever the process chosen, the starting point of the cycle is the injection moulding of a preform possessing a controlled thermal history which gives to the depolymerized random terpolymers a regular and fine crystalline structure.

In the cold cycle, the preform is reheated as homogeneously as possible throughout its thickness; in the hot cycle, the preform is cooled to a temperature lying immediately below its melting point; then, in both cases, it is subjected to considerable longitudinal and transverse stretching (stretching ratio of approximately 4 to 15), in order to generate strong tensions which disintegrate the crystalline structure; for this reason, the optical properties are improved.

Special attention must be paid to controlling the stretching temperature. It lies immediately below the melting temperature.

The use of the degraded (depolymerized) random propylene terpolymers according to the present invention offers various advantages: the hollow bodies and the bottles have a favourable price/properties ratio, good mechanical properties and a very high transparency. They are particularly suitable for the packaging of detergents, cosmetics, medicaments and foodstuffs.

The example which follows is intended to illustrate the invention. It relates to the preparation of a hollow body (bottle) made of a composition based on a degraded random propylene terpolymer. The composition employed was composed of:

| Ingredients in g | |
| --- | --- |
| Random propylene terpolymer (melting temperature: 126° C.; melt flow index $MFI_i$: 5 g/10 min) | 1000 |
| Irganox ® 1010 product | 1 |
| Calcium stearate | 1 |
| Ultranox ® 626 product | 0.5 |
| Antistatic agent | 1 |
| Dibenzylidenesorbitol (nucleating agent) | 2.4 |
| DBPH peroxide | 0.45 |

This composition was granulated and degraded by extrusion in the vicinity of 220° C.

The random terpolymer employed in the example comprised 2.5% by weight of monomer units derived from ethylene and 7% by weight of monomer units derived from 1-butene. Its melt flow index $MFI_g$ (after degradation by extrusion of granules in the presence of DBPH peroxide) amounted to 10 g/10 min. Its degradation factor A consequently amounted to 2. Furthermore, the said degraded random terpolymer exhibited a molecular weight distribution Mw/Mn of 5.5.

Starting from the granules, preforms were injected at 210° C., were subsequently reheated to 120° C. and then stretch blow moulded at this temperature on an RBU 225 machine (constructed by Bekum Maschinenfabriken GmbH, Berlin, Germany) in order to obtain transparent biaxially oriented bottles with a capacity of one liter.

What is claimed is:

1. A process for the manufacture of biaxially oriented hollow bodies by injection moulding a random propylene polymer to provide at least one perform, wherein the random propylene polymer is a random propylene terpolymer comprising
   from 83 to 97.5% by weight of monomer units derived from propylene,
   from 0.5 to 5% by weight of monomer units derived from ethylene and
   from 2 to 12% by weight of monomer units derived from 1-butene, which has a melting temperature of 120 to 150° C. and which is degraded by a free radical generator, the degradation factor A being from 1.5 to 10 and the said factor A being defined as being the ratio $MFI_g/MFI_i$, in which $MFI_g$ is the melt flow index of the degraded product and is between 3 and 30 g/10 min and $MFI_i$ is the melt flow index of the initial copolymer and is between 2 and 15 g/10 min, and stretch blowmoulding said preform to provide said hollow body.

2. A process for the manufacture of biaxially oriented hollow bodies comprising injection moulding a random propylene polymer to provide at least one preform, wherein the random propylene polymer is a random propylene terpolymer containing
   from 1.5 to 3% by weight of monomer units derived from ethylene and
   from 5 to 8% by weight of monomer units derived from 1-butene, the balance being composed of monomer units derived from propylene, having a melting temperature of 120 to 150° C. and a melt flow index $MFI_i$ of between 2.5 and 7 g/10 min which has been degraded by a free radical generator to a degraded product having a melt flow index $MFI_g$ of between 3 and 30 g/10 min, the degradation factor A, defined as the ratio $MFI_g/MFI_i$ being from 1.5 to 5; and stretch blow moulding said preform to provide said hollow body.

3. The process according to claim 2, which further comprises controlling the temperature of the preform resulting from the injection at the temperature of orientation of the terpolymer, prior to the stretch blowmolding step which comprises longitudinally stretching the preform and blow-moulding.

4. The process of claim 3, wherein the hollow body is manufactured in single stage.

5. The process according to claim 2, wherein the hollow body is manufactured in two stages, the first stage comprising the injection moulding of said preform and allowing said preform to cool; and the second stage comprising subjecting the preform to thermal conditioning at the temperature of terpolymer orienitation and stretch blowmoulding the preform.

6. The process according to claim 2, wherein the random propylene terpolymer exhibits a melt flow index after degradation, $MFI_g$, ranging from 5 to 20 g/10 min.

7. The process for the manufacture of biaxially oriented hollow bodies according to claim 2, in which process the degraded random propylene terpolymer exhibits a molecular mass distribution (Mw/Mn) of between 3 and 8.

8. The process of claim 2 wherein the preform is formed into a package for detergents, cosmetics, medicaments and/or foodstuff.

9. The process of claim 2 wherein the preform is formed into a bottle.

10. A process for the manufacture of biaxially oriented plastic bottle comprising injection moulding of a random propylene polymer to provide at least one preform
   wherein the random propylene polymer is a random propylene terpolymer containing
   from 1.5 to 3% by weight of monomer units derived from ethylene and
   from 5 to 8% by weight of monomer units derived from 1-butene, the balance being composed of monomer units derived from propylene, having a melting temperature of 120 to 150° C. and a melt flow index $MFI_i$ of between 2.5 and 7 g/10 min which has been degraded by a free radical generator to a degraded product having a melt flow index $MFI_g$ of between 3 and 30 g/10 min, the degradation factor A, defined as the ratio $MFI_g/MFI_i$ being from 1.5 to 5; and stretch blow moulding said preform.

11. The process according to claim 10, which further comprises controlling the temperature of the preform resulting from the injection at the temperature of orientation of the terpolymer, prior to the stretch blowmolding step which comprises longitudinally stretching the preform and blow-moulding.

12. The process of claim 10, wherein the plastic bottle is manufactured in single stage.

13. The process according to claim 10, wherein the plastic bottle is manufactured in two stages, the first stage comprising the injection moulding of said preform and allowing said preform to cool; and the second stage comprising subjecting the preform to thermal conditioning at the temperature of terpolymer orientation and stretch blowmoulding the preform.

14. The process according to claim 10, wherein the random propylene terpolymer exhibits a melt flow index after degradation, $MFI_g$, ranging from 5 to 20 g/10 min.

15. The process for the manufacture of biaxially oriented plastic bottles according to claim 10, in which process the degraded random propylene terpolymer exhibits a molecular mass distribution (Mw/Mn) of between 3 and 8.

16. The process of claim 1, wherein the stretch blow-moulding step further comprises longitudinally stretching said preform.

17. The process of claim 16, wherein the stretch blow-moulding step further comprises transversely stretching said preform.

18. The process of claim 16, wherein said stretching of said preform is undertaken at a temperature below the melting point of the terpolymer.

19. The process of claim 17, wherein said stretching of said preform is undertaken at a temperature below the melting point of the terpolymer.

* * * * *